Nov. 25, 1958 R. R. FROST ET AL 2,862,187
SIGNAL MODULATING SYSTEM
Filed Nov. 6, 1956
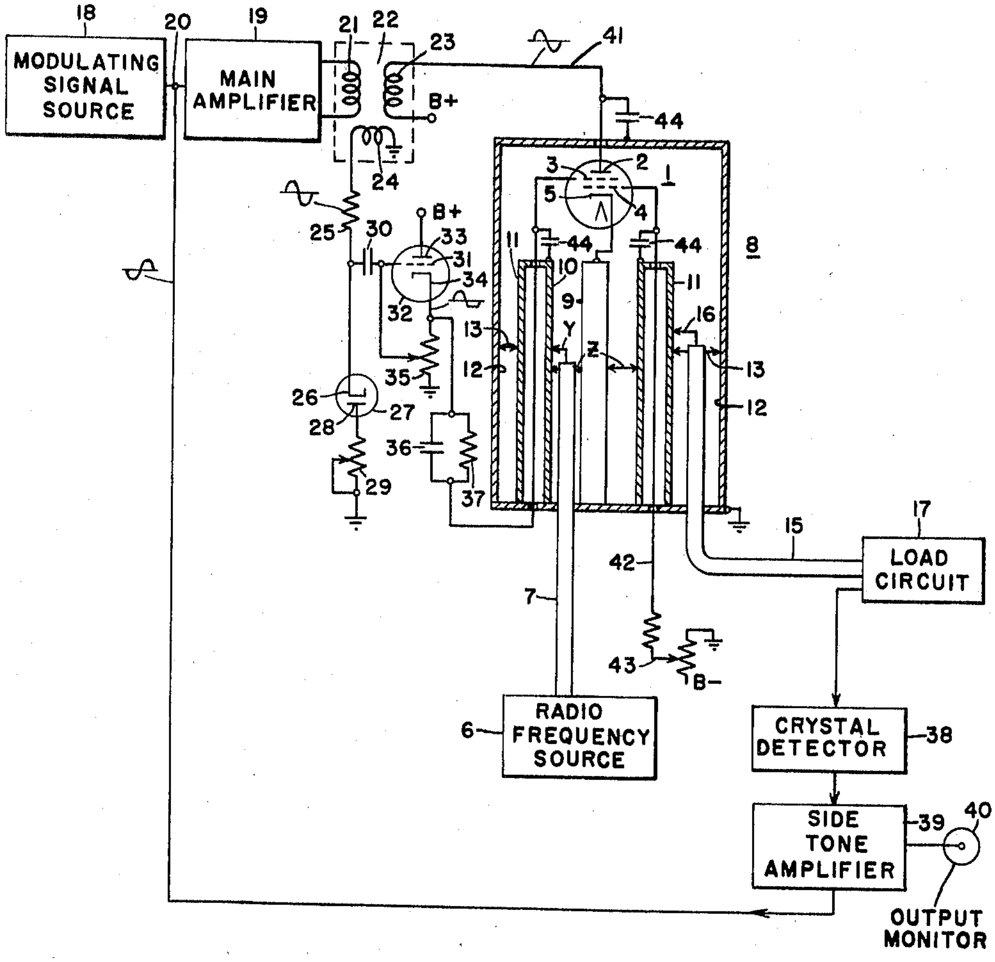
INVENTORS:
JOHN F. ADAMS,
RANDOLPH R. FROST,
BY Michael Masnik
THEIR AGENT.

United States Patent Office 2,862,187

Patented Nov. 25, 1958

2,862,187

SIGNAL MODULATING SYSTEM

Randolph R. Frost, Syracuse, and John F. Adams, Potsdam, N. Y., assignors to General Electric Company, a corporation of New York Application November 6, 1956, Serial No. 620,715

7 Claims. (Cl. 332—37)

This invention relates primarily to signal modulation systems and particularly to an arrangement for amplitude modulating radio frequency signals of large power over a wide band width with minimum distortion.

There is a growing need in the field of signal communication for an arrangement capable of transmitting data over a wide band width with minimum distortion at long ranges. Previous attempts to provide signal modulated radio frequency waves of high power, low modulation distortion, and wide modulation band width with a minimum of stages have been relatively unsuccessful.

It is therefore an object of our invention to provide an improved high power signal communication arrangement.

Another object of our invention is to provide an improved means for amplitude modulating a radio frequency carrier.

Another object of our invention is to provide an improved signal modulation arrangement capable of wide modulation band width and minimum modulation distortion operation.

Another object of our invention is to provide an improved signal processing arrangement.

Another object of our invention is to provide an improved arrangement for signal modulating a single amplifying stage.

Another object of our invention is to minimize signal modulation distortion in radio communication arrangements.

A further object of our invention is to provide an improved feedback arrangement to compensate for differences in the overall feedback ratio caused by changes in the efficiency of a radio frequency amplifier tube.

In accordance with an embodiment of my invention applicable to the signal modulation of a high powered tetrode amplifying tube, a combination of wave shaping and modulating signal isolation is provided for realizing high powered signal modulation over a wide modulation band width with minimum distortion. In a particular application of the invention, a single power amplifying stage provided over a kilowatt of radio frequency power at a frequency of several hundred megacycles per second with a modulating signal band width of from 200 to 25,000 cycles per second and a modulation distortion of less than 5%.

The features of the present invention which are believed to be novel are particularly pointed out in the appended claims.

The single figure illustrates in circuit and block diagram form the features of the present invention.

Referring to the figure, there is shown a power amplifier stage comprising an electron discharge device 1 in the form of a tetrode having a plate electrode 2, a screen electrode 3, a grid or control electrode 4 and a cathode 5. The plate electrode 2 is energized with direct voltage from B+ over lead 41, whereas the control grid 4 is energized with a negative bias voltage from B— over lead 42. Potentiometer arrangement 43 provides an adjustable B— voltage for selecting the operating conditions of the power amplifier stage. Condensers 44 operate as radio frequency bypass condensers. Radio frequency power from source 6 is applied over the coaxial line 7 to a coaxial cavity resonator 8. Resonator 8 comprises an input cavity portion comprising an inner conductor 9 and an outer conductor 10 and an output cavity portion comprising an inner conductor 11 and an outer conductor 12. The operating frequency of the cavity and the tube are determined by the position of shorting bars between the inner and outer conductors 11 and 12. Amplified radio frequency power is developed in the output cavity portion of the coaxial cavity resonator 8. The resonant frequency of this output cavity is determined by the position of the shorting bar 13 between the inner and outer conductors 11 and 12 respectively. The load circuit 14 for utilizing the amplified radio frequency power is coupled by a coaxial line 15 to the output cavity comprising conductors 11 and 12. 16 constitutes the coupling loop for supplying amplified radio frequency power to the load circuit.

In order to modulate the radio frequency power delivered to the load circuit 17 in accordance with the modulating signals available from source 1, the following scheme is employed. Modulating signals, as for example in the range of 200 to 25,000 cycles per second are applied from source 18 to the main amplifier stage 19 by means of connections 20. After amplification in amplifier 19 to a proper level, the amplified modulating signal is then applied to the primary winding 21 of the modulation transformer 22. This modulation transformer has a secondary winding 23 coupled between B+ and the plate electrode 2 of device 1. An additional secondary winding 24 is connected between ground and through series clipping resistor 25 to the cathode 26 of a unidirectional conducting device 27. In the particular embodiment shown, device 27 constitutes a diode with its plate electrode 28 connected through an adjustable resistor 29 to ground. Coupling condenser 30 connects the cathode 26 to the control grid 31 of a cathode follower stage comprising a triode electron discharge device 32. This device has its anode electrode 33 connected to B+ and its cathode 34 connected through the cathode load resistor 35 to ground. The cathode 34 is connected through a parallel circuit consisting of condenser 36 and resistor 37 to the screen electrode 3. The condenser 36 and resistor 37 operate as a regulating arrangement providing a desirable low A. C. driving impedance and for protection of the screen, a higher D. C. impedance.

The diode device 27 operates as an amplitude clipper for clipping the negative going portion of the modulating signal available on transformer winding 24. This clipped signal is then applied through the cathode follower stage to the screen electrode 3. The direct current operating bias for screen 3 is determined by the position of the movable tap on resistor 35 connected between the cathode 34 and ground. It is known that the amplification of the screen grid 3 is non-linear in certain operating frequency regions. The amplitude clipping feature in combination with the cathode follower feature operates to compensate for this non-linearity and thereby reduce the distortion in the output radio frequency signal.

In a particular embodiment the power amplifier stage was operated in the range of several hundred megacycles and the modulating signal consisted of a sine wave in the region of 200 to 25,000 cycles per second. These modulating signals, available from the output terminals of transformer 22, were applied in phase to modulate the plate electrode 2 and the screen electrode 3 of the device 1. To overcome the distortion inherent in the device 1, the clipper circuit comprising device 27 operates to remove a portion of the negative-going portion of the modulating signal appearing at the cathode in accordance with the position of the movable tap on resistor 29. This clipped signal is then applied through the cathode follower stage comprising device 32 to the screen electrode to modulate the radio frequency being amplified by this power amplifier stage. The arrangement disclosed operated to considerably reduce distortion of the output power. In order further to reduce the distortion due to modulation, a portion of the output signal appearing at the load circuit 17 is detected by detector 38 and applied to the side tone amplifier 39. Lead 40 provides an output connection for the purpose of analyzing the wave form developed in the amplifier 39. The output from the side tone amplifier is also applied in negative feedback fashion to the main amplifier 18 to further help reduce the distortion in the system. An additional feature has been included in the side tone amplifier unit to compensate for differences in the overall feedback ratio caused by the changes in efficiency inherent in the radio frequency amplifier output stage. A D. C. reference voltage is obtained from the detector 38. This D. C. voltage is used to change the gain of the side tone amplifier so the overall feedback ratio remains substantially the same over the operating radio frequency range of the radio frequency power amplifier.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a signal amplifier having a screen electrode and a plate electrode, a source of a first frequency signal, a source of a second frequency signal, means for applying said first signal to said amplifier, means for modulating said applied signal with said second signal comprising means for applying said second signal to said plate electrode, means for clipping a negative portion of the said second signal from said source, and means for applying said clipped signal to said screen electrode comprising a cathode follower circuit.

2. In combination, a radio frequency signal amplifier having a screen electrode and a plate electrode, a source of a radio frequency signal, a source of a modulating signal, means for applying said radio frequency signal to said amplifier, means for amplitude modulating said radio frequency signal with said modulating signal comprising means for applying said modulating signal to said plate electrode, means for clipping a negative portion of the modulating signal from said source, and a cathode follower circuit responsive to said clipped signal for applying said clipped signal to said screen electrode.

3. In combination, a signal amplifier having a screen electrode and a plate electrode, a source of a carrier frequency signal, a source of a modulating signal, means for applying said carrier frequency signal to said amplifier, means for amplitude modulating said applied carrier signal with said modulating signal comprising means for applying said modulating signal to each of said electrode in phase, said means for applying comprising means for reducing the distortion in the modulated carrier frequency signal, said distortion reduction means comprising means for clipping a negative portion of said modulating signal and a cathode follower responsive to said clipped signal for applying said clipped signal to said screen electrode.

4. In combination, a signal amplifier stage having a screen and plate electrode, a source of a carrier signal, a source of a modulating signal, a signal modulation transformer comprising a primary winding and two secondary windings, means for coupling said primary winding to said source of a modulating signal, means for coupling one of said secondary windings to said plate electrode, a cathode follower circuit coupling said modulating signal from the other of said secondary windings to said screen electrode, a unidirectional conducting device coupled to said cathode follower circuit, and means for biasing said device to clip a negative portion of the modulating signal coupled to said screen electrode by said cathode follower.

5. In combination, a signal amplifier stage having a screen and plate electrode, a source of a carrier signal, a source of a modulating signal, a signal modulation transformer comprising a primary winding and two secondary windings, a source of B+ potential, said primary winding coupled to said source of a modulating signal, a cathode follower circuit comprising an anode, cathode, and a control electrode, one of said secondary windings connected between said source of B+ potential and said plate electrode, said screen electrode coupled to said cathode, the other of said secondary windings coupled between said control electrode and said amplifier, a unidirectional conducting device connected between said control electrode and said cathode, and means for biasing said device to clip a negative portion of the modulating signal applied to said control electrode by said other secondary winding.

6. In combination, a signal amplifier having a screen electrode, a plate electrode and a control electrode, a source of a carrier frequency signal, a source of a modulating signal, means for applying said carrier frequency signal to said control electrode, means for amplitude modulating said applied carrier signal with said modulating signal comprising means for applying said modulating signal to said screen and plate electrodes in phase, means for reducing the distortion in the modulated carrier frequency signal due to said amplifier, said distortion reduction means comprising means for clipping a negative portion of said modulating signal and a cathode follower responsive to said clipped signal for applying said clipped signal to said screen electrode.

7. In combination, a signal amplifier stage having a screen electrode, a plate electrode and a control electrode, a source of a carrier signal, a source of a modulating signal, a cathode follower circuit comprising an anode, cathode, and a control electrode, a source of B+ potential energizing said amplifier and said cathode follower circuit, said screen electrode coupled to said cathode, means for applying modulating signals from said modulating signal source to the control electrode of said cathode follower circuit, a unidirectional conducting device connected between said control electrode and said cathode of said cathode follower circuit, and means for biasing said device to clip a negative portion of said applied modulating signal.

References Cited in the file of this patent

UNITED STATES PATENTS

| | | |
|---|---|---|
| 2,095,371 | Rohnfeld | Oct. 12, 1937 |
| 2,224,690 | Moodey et al. | Dec. 10, 1940 |